(12) United States Patent
Denk et al.

(10) Patent No.: US 7,902,785 B2
(45) Date of Patent: Mar. 8, 2011

(54) METHOD AND DEVICE FOR GUIDING THE MOVEMENT OF A MOVEABLE MACHINE ELEMENT OF A MACHINE

(75) Inventors: Joachim Denk, Nürnberg (DE); Klaus Geissdörfer, Erlangen (DE); Jens Hamann, Fürth (DE); Elmar Schäfers, Fürth (DE); Bernd Wedel, Möhrendorf (DE)

(73) Assignee: Siemens Aktiengesellschaft, München (DE)

( * ) Notice: Subject to any disclaimer, the term of this patent is extended or adjusted under 35 U.S.C. 154(b) by 386 days.

(21) Appl. No.: 12/089,770

(22) PCT Filed: Sep. 27, 2006

(86) PCT No.: PCT/EP2006/066804
§ 371 (c)(1),
(2), (4) Date: Aug. 11, 2008

(87) PCT Pub. No.: WO2007/042399
PCT Pub. Date: Apr. 19, 2007

(65) Prior Publication Data
US 2009/0160389 A1 Jun. 25, 2009

(30) Foreign Application Priority Data
Oct. 10, 2005 (DE) .......................... 10 2005 048 390

(51) Int. Cl.
*G05B 19/25* (2006.01)
(52) U.S. Cl. ......... 318/573; 318/572; 318/560; 318/567; 318/569; 700/41; 700/151
(58) Field of Classification Search .................. 318/573, 318/572, 560, 567, 569; 700/41, 151
See application file for complete search history.

(56) References Cited

U.S. PATENT DOCUMENTS

| 4,513,232 | A  | * | 4/1985 | Safiuddin ..................... 318/561 |
| 6,385,555 | B1 | * | 5/2002 | Hoffmann et al. ............. 702/145 |
| 6,744,233 | B1 |   | 6/2004 | Tsutsui |
| 2004/0239280 | A1 |   | 12/2004 | Kaku |

FOREIGN PATENT DOCUMENTS

DE 101 29 141 A1 12/2002
DE 103 24 692 A1 1/2005

OTHER PUBLICATIONS

Prof. Dr,-Ing. Rolf Unbehauen, Universität Erlangen-Nëmberg; 4., verbesserte Auflage (mit 149 Abblldungen); R.Oldenbourg Verlag München Wien 1983; Others; 1983.
Dlpl-Ing. Friedrich Lange, Kassel; Others; 2003.

* cited by examiner

*Primary Examiner* — Walter Benson
*Assistant Examiner* — David S Luo
(74) *Attorney, Agent, or Firm* — Henry M. Feiereisen; Ursula B. Day

(57) ABSTRACT

The invention relates to a method for guiding the displacement of a displaceable machine element (18) in a machine, comprising the following steps: a) specification of a guide target variable ($x_{targ}$) that describes the desired displacement operation of the machine element (18); b) determination of a pilot actual variable ($M_{pilot}$) and/or a guide actual variable ($x_{act}$) from the guide target variable ($x_{targ}$) using a model (2), said model (2) comprising a path model (3), which simulates the dynamic behaviour of the elements (16, 18) involved in the displacement. The invention also relates to a device that corresponds to the method. The invention permits the optimised guidance of the displacement of a displaceable machine element (18) in a machine.

14 Claims, 2 Drawing Sheets

METHOD AND DEVICE FOR GUIDING THE MOVEMENT OF A MOVEABLE MACHINE ELEMENT OF A MACHINE

BACKGROUND OF THE INVENTION

The invention relates to a method and a device for guiding the movement of a moveable machine element of a machine.

In order to guide the movement of a moveable machine element of a machine such as, for example, a machine tool, production machine and/or a robot, the generation of desired reference variables such as for example, desired position, desired speed and/or desired acceleration, as desired control variables for the controls connected to a controller, for controlling the motors of the machine that provide the drive for the travel movement of the machine element is one of the central tasks of the controller. Each machine in this case generally has a number of machine axes, it being possible for each machine axis to move in a direction of the machine axis, generally with the aid of a motor assigned to said machine axis and further components, such as for example a gearbox of the moveable machine element, it being possible for the machine element to be present, for example, as a tool slide with a clamped workpiece and/or, for example, in the form of a tool. The motor, the further components and the machine element in this case constitute elements participating in the movement.

When calculating the desired reference variables for the individual machine axes of a machine, modern controllers mostly take account of the efficiency of the relevant machine axes in such a way that the reference variables are generated in such a way that the permissible limiting values are not exceeded during the movement of the moveable machine element. In order, moreover, to avoid exciting critical natural frequencies of the elements participating in the movement, it is customary in the art to carry out various measures that are, however, attended by in part considerable losses in the dynamics of the movement operation of the moveable machine element. One of these measures is, for example, the so-called jerk limitation. The change in the acceleration, that is to say the jerk, is prescribed in accordance with specific profiles or is held within defined bounds. Particularly in the case of machine tools, the path speed of the movement to be carried out is reduced until the jerk limitations of the individual machine axes are complied with and the path jerk defined on the path is not exceeded. It follows that a targeted adaptation to the vibration behavior is possible only to a very limited extent, particularly in the case of machine tool applications. The jerk must be greatly reduced in the interests of an adequate accuracy of fabrication, and so the dynamics are substantially restricted, and this leads to higher fabrication costs.

A further known possibility is the use of so-called cam disks. In many applications, particularly as production machines, the individual values of the desired reference variables are generated with the aid of cam disks. The cam disk profiles are composed in this case from polynomials. The aim 1n this case is to achieve a low vibration excitation by means, for example, of heuristic stipulation (cam disks as "soft" as possible, use of polynomials of high order). An adaptation to the mechanical vibration behavior of the elements participating in the movement can be attended by a corresponding slowing down of the process, something which is likewise already accompanied by the above-named disadvantages.

A further known possibility for reducing the vibration load is so-called linear desired reference variable filters. In this case, linear filters are used to reduce the spectral components in the range of critical frequencies. However, a signal delay is always associated with such filtering. Particularly in the case of machine tools, inaccuracies in fabrication therefore arise.

SUMMARY OF THE INVENTION

It is the object of the invention to enable an optimized guidance of the movement of a moveable machine element of a machine.

This object is achieved by a method for guiding the movement of a moveable machine element of a machine, having the following method steps:
a) specifying a desired reference variable describing a desired movement operation of the machine element,
b) determining an actual precontrol variable and/or an actual reference variable from the desired reference variable with the aid of a model, the model having a system model that simulates the dynamic behavior of the elements participating in the movement.

Furthermore, this object is achieved by a device for guiding the movement of a moveable machine element of a machine, the device having:
a means for generating a desired reference variable in order to specify a desired reference variable describing a desired movement operation of the machine element,
a model having a system model that simulates the dynamic behavior of the elements participating in the movement, it being possible to use the model to carry out a determination of an actual precontrol variable and/or an actual reference variable from the desired reference variable.

It turns out to be advantageous for the invention to feed the actual precontrol variable and/or the actual reference variable into a control loop for controlling a motor of the machine. This enables an optimized control of the motor.

Furthermore, it turns out to be advantageous for the invention when the method is carried out in real time during the movement operation of the machine element. Consequently, an optimized guidance of movement is enabled during the fabrication operation without the need for expensive calculation in advance.

Furthermore, it turns out to be advantageous for the invention when it is exclusively the mechanical properties of the participating elements that are simulated in the plant in order to determine the dynamic behavior, since such a system model can be set up with particular ease.

Furthermore, it turns out to be advantageous for the invention when a controlled system model is used as model. Implementing the model as a controlled system model can be done with particular ease.

In this context, it proves to be advantageous for the invention when use is made as model of a controlled linear system model that is controlled by means of a linear control law. Implementing the model as a controlled linear system model can be done with particular ease.

Furthermore, it proves to be advantageous for the invention when an output variable of the system model that is modified by means of a feedback variable is fed back to an input variable of the system model. Control can be attained in a simple way through this measure.

Furthermore, it proves to be advantageous for the invention when a desired position, a desired speed or a desired acceleration is provided as desired reference variable. A desired position, a desired speed or a desired acceleration constitute desired reference variables normally used technically.

Furthermore, it proves to be advantageous for the invention when the actual reference variable is time delayed before it is fed into the control loop for controlling a motor of the machine. This enables a temporal adaptation of the actual reference variable to the temporal behavior of the power module (for example to the converter) that controls the energy supply of the motor.

Furthermore, it proves to be advantageous for the invention when the control loop has a position controller, the difference between the actual reference variable and a measured actual variable being fed to the position controller in order to control the motor. This enables an optimized position control.

Furthermore, it proves to be advantageous for the invention when the control loop has a speed controller, the sum of the output signal of the speed controller and the actual precontrol variable being formed, the sum formed in such a way influencing the level of the motor current. This enables a particularly optimized guidance of movement.

Furthermore, it proves to be advantageous for the invention when the machine is designed as a machine tool, production machine and/or as a robot. Particularly in the case of machine tools, production machines and/or robots, vibration problems occur in the case of the guidance movement, for example. Of course, however, the invention can also be used with other types of machines.

Furthermore, it proves to be advantageous for the invention when the actual precontrol variable and/or the actual reference variable are/is fed into a control loop for controlling a motor of the machine. This enables an optimized control of the motor.

Furthermore, it proves to be advantageous for the invention when the control loop has a position controller, the difference between the actual reference variable and a measured actual variable being fed to the position controller in order to control the motor. This enables an optimized control of the motor.

Furthermore, it proves to be advantageous for the invention when the control loop has a speed controller, the sum of the output signal of the speed controller and the actual precontrol variable being formed, the sum formed in such a way influencing the level of the motor current. This enables an optimized control of the motor.

Furthermore, it proves to be advantageous for the invention that there is provided for the inventive device a computer program product that includes code sections with the aid of which the method can be executed.

Advantageous designs of the method follow by analogy with the advantageous design of the device, and vice versa.

BRIEF DESCRIPTION OF THE DRAWING

An exemplary embodiment of the invention is illustrated in the drawing and explained in more detail below. In the drawing.

DETAILED DESCRIPTION OF PREFERRED EMBODIMENTS

Figure 1:
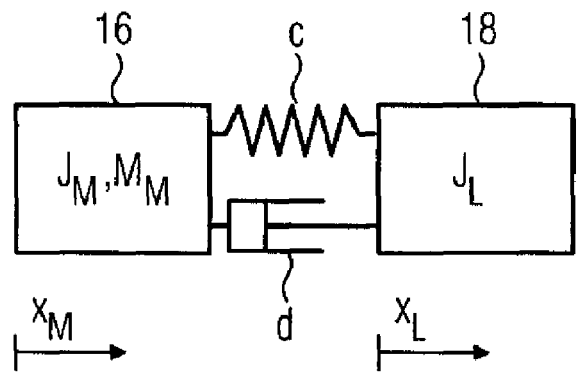
FIG. 1 shows a schematic of a two-mass vibrator.

FIG. 1 shows the schematic of a two-mass vibrator comprising a motor 16 that is connected to a load 18. The motor 16 has a motor inertia $J_M$ and a motor torque $M_M$. The load 18 has a load inertia $J_L$. The connection between the motor 16 and the load 18 has a stiffness c and a damping d. The connection can for example be present in the form of a gearbox. When the position $x_M$ of the rotor of the motor 16 varies ($x_M$=rotor position angle), as a consequence of the finite torsional stiffness, in particular for the dynamic situation, inter alia, the position of the load $x_L$ does not vary as would be expected just by a variation in the position of the motor $x_M$, but the position of the load $x_L$ begins to vibrate with respect to the position of the motor $x_M$. The system dynamics of the two mass vibrators from FIG. 1 with the motor torque $M_M$ is described mathematically by the system of differential equations $$J_M \cdot \ddot{x}_M + d \cdot (\dot{x}_M - \dot{x}_L) + c \cdot (x_M - x_L) = M_M \quad (1)$$

$$J_L \cdot \ddot{x}_L - d \cdot (\dot{x}_M - \dot{x}_L) - c \cdot (x_M - x_L) = 0$$

After the substitutions $$x_1 = x_M = x_M(t), x_2 = x_L, x_3 = \dot{x}_M = v_M(t), x_4 = \dot{x}_L,$$
$$u = M_M = m_M(t) \quad (2)$$

this results in $$\dot{x}_1 = x_3 \quad (3)$$

$$\dot{x}_2 = x_4$$

$$\dot{x}_3 = J_M^{-1} \cdot [-d \cdot (x_3 - x_4) - c \cdot (x_1 - x_2) + u]$$

$$\dot{x}_4 = J_L^{-1} \cdot [d \cdot (x_3 - x_4) + c \cdot (x_1 - x_2)]$$

or, in short, $$\underline{\dot{x}} = \underline{A} \cdot \underline{x} + \underline{b} \cdot u \quad (4)$$

with the state vector $$\underline{x} = [x_1 \ x_2 \ x_3 \ x_4]^T \quad (5)$$

and $$A = \begin{bmatrix} 0 & 0 & 1 & 0 \\ 0 & 0 & 0 & 1 \\ -J_M^{-1} \cdot c & J_M^{-1} \cdot c & -J_M^{-1} \cdot d & J_M^{-1} \cdot d \\ J_M^{-1} \cdot c & -J_M^{-1} \cdot c & J_M^{-1} \cdot d & -J_M^{-1} \cdot d \end{bmatrix} \quad (6)$$

$$\underline{b} = \begin{bmatrix} 0 \\ 0 \\ 1 \\ 0 \end{bmatrix} \quad (7)$$

In the context of the exemplary embodiment, the machine axis of the machine is formed by the motor 16, by the load 18 and by the connection between the motor 16 and the load 18, the connection having the stiffness c and a damping d. That is to say the elements participating in the movement are formed by the motor 16, by the connection and by the load 18.

In the context of the exemplary embodiment, in the above-described system model for determining the dynamic behavior of the elements participating in the movement is exclusively the mechanical properties of the participating elements that are simulated in the system model. The system model can thus be set up with particular ease. However, it also possible in principle to give consideration when forming the model to the behavior of a power module (for example converter) driving the motor 16. This has the disadvantage, however, that the system model becomes dependent on the parameterization of the power module. By contrast, the behavior of the power module, as well as, possibly, of further delays not considered in the model, can be introduced independently of the design of the system model by means of a delay device downstream of the system model.

Figure 2:
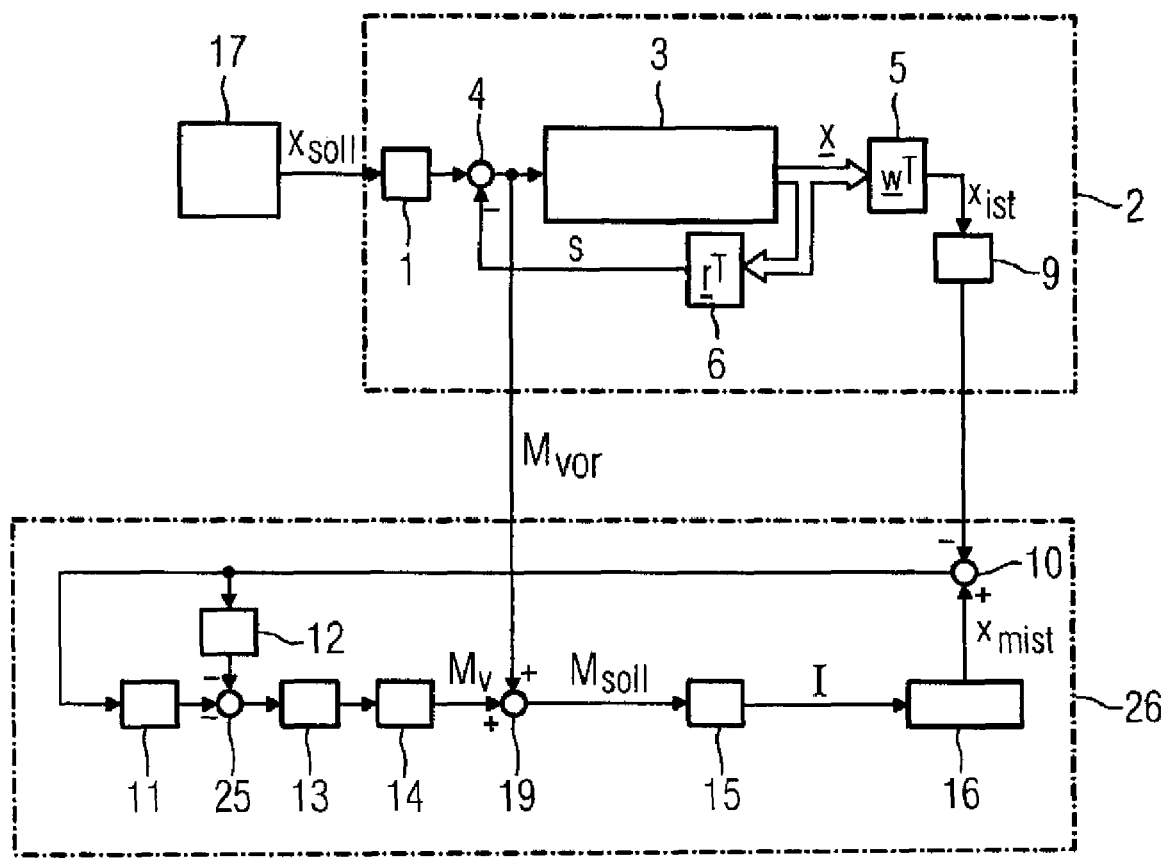
FIG. 2 shows a schematic of an inventive method and an inventive device for guiding the movement of a moveable machine element of a machine.

FIG. 2 illustrates in the context of a schematic an inventive method and an inventive device for guiding the movement of a movable machine element of a machine. The device can in this case be present, for example, in the form of a numerical controller and/or a control device of the machine. The device has a means 17 for generating a reference variable that generates a desired reference variable $x_{soll}$ describing the desired movement operation of the machine element, that is to say the load 18 in the exemplary embodiment, that is present as desired reference position in the context of the exemplary embodiment, and in this way prescribes it. Instead of a position, however, it would also be possible to prescribe a speed or acceleration of the means 17 for generating a desired reference variable. The means 17 for generating a reference variable is present in the prior art as a component of the numerical controller in machines such as, for example, machine tools, production machines and/or robots. In this case, the desired reference variable $x_{soll}$ is fed in the prior art as desired variable to a downstream control loop that controls the movement operation of the machine element to be moved in accordance with the prescribed desired reference variable $x_{soll}$.

According to the invention, a model 2 is now interposed between the means 17 for generating a desired reference variable and the control loop 26, in order to determine an actual reference variable $x_{ist}$ and/or an actual precontrol variable $M_{vor}$. In the course of the exemplary embodiment, the actual precontrol variable $M_{vor}$ is present as precontrol torque, and the actual reference variable $x_{ist}$ is present as actual variable of the position model in the course of the exemplary embodiment. Model 2 in this case has the system model 3 already described above, and a state controller that is implemented in the form of a return vector 6 and an adaptation element 1. Furthermore, the model 2 has an adaptation vector w (see reference numeral 5). In the course of the exemplary embodiment, the model 2 is present in the form of a controlled system model in the case of which an output variable of the system model that is modified by means of a return variable (see reference numeral 6), which is designed in the context of the exemplary embodiment as return vector r, and is designed as state vector x in the context of the exemplary embodiment, is fed back to an input variable of the system model 3. The mechanical behavior of the motor 16, the load 18 and the mechanical connection between motor 16 and load 18 is simulated with the aid of the system model 3, and in this way the dynamic behavior of the elements participating in the movement is simulated. With the aid of the state controller, undesired properties of the elements participating in the movement are compensated in advance in such a way, and the actual precontrol variable $M_{vor}$ and the actual reference variable $x_{ist}$ are determined. The return vector $\underline{r}$ (see reference 6), which makes a scalar variable s from the state vector $\underline{x}$, has the form $$\underline{r} = \begin{bmatrix} r_1 \\ r_2 \\ r_3 \\ r_4 \end{bmatrix} \quad (8)$$

in the context of the exemplary embodiment, with the return coefficients $r_1$, $r_2$, $r_3$ and $r_4$, in which case it holds that $$s = \underline{x} \cdot \underline{r}^T \quad (9)$$

The adaptation vector w that is required to generate the scalar actual reference variable $x_{ist}$ and makes the scalar actual reference variable $x_{ist}$ from the state vector $\underline{x}$ has the form of $$\underline{w} = \begin{bmatrix} 1 \\ 0 \\ 0 \\ 0 \end{bmatrix} \quad (10)$$

in the context of the exemplary embodiment, in which it holds that $$x_{ist} = \underline{x} \cdot \underline{w}^T \quad (11)$$

For a controlled system that is described in a form in accordance with the relationship (4) and has a manipulated variable u, the calculation of the return coefficients $r_1$, $r_2$, $r_3$ and $r_4$ of the return vector r can be performed, for example, with the aid of the so called Ackermann's formula generally known in control technology, in which case it holds that $$\underline{r}^T = \underline{t}_a^T \cdot p(\underline{A}) \quad (12)$$

Here p(A) is the characteristic polynomial of the controlled system, and is thus yielded from the desired eigenvalues of the control system with $$p(s) = s^n + p_{n-1} \cdot s^{n-1} + \ldots + p_1 \cdot s + p_0 \quad (13)$$

Here $t_a^T$ is the last row of the inverse controllability matrix $\underline{Q}_s^{-1}$ with $$\underline{Q}_s^{-1} = [\underline{b}, \underline{A} \cdot \underline{b}, \ldots, \underline{A}^{n-1} \cdot \underline{b}]^{-1} \quad (14)$$

It is evident here that controllability of the controlled system is to be presupposed. However, controllability always obtains in the case of the systems considered here.

The return variable r can be selected in this case such that an individual or a number of natural vibration frequencies of the system model 3 are damped. The overall gain of the model 2 can be influenced with the aid of the adaptation element 1 which can be present, for example, in the form of a prefilter. Thus, in the simplest case the adaptation element 1 can constitute a multiplication of the desired reference variable $x_{soll}$ by a constant factor (for example, 1.5). A subtracter 4 is used to subtract the output variable x (state vector) modified by means of the return variable r of the system model 3 from the desired reference variable $\bar{x}_{soll}$ modified by the adaptation element 1, and the output signal generated in such a way by the subtracter 4, which constitutes the actual precontrol variable $M_{vor}$ is fed as input variable to the system model 3. The state vector $\underline{x}$ is output thereby as output variable, the scalar actual reference variable $x_{ist}$ subsequently being generated by means of the adaptation vector w. With the aid of a downstream delay device 9, the actual reference variable $x_{ist}$ is delayed in accordance with the delay of the power module 15 (time that is required by the power module 15 in order to build up the current I) and output at the output of the delay device 9. However, the delay need not necessarily be carried out.

The actual precontrol variable $M_{vor}$ determined in such a way, and the delayed actual reference variable $x_{ist}$ are fed into the control loop 26 for controlling the motor 16. A subtracter 10 is used to calculate the delayed actual reference variable $x_{ist}$ from a measured actual variable $x_{mist}$ that is, for example, measured by means of a transmitter and is present in the exemplary embodiment in the form of a position ($x_{mist}$=rotor position angle) measured at the motor. The difference calculated in such a way is subsequently fed to a differentiator 12 that determines the time derivative and passes it on to a position controller 11. The output variable of the differentiator 12 and of the position controller 11 are negated and added with the aid of the adder 25. The output variable of the adder 25 is fed as input variable to a speed controller 13. The output variable of the speed controller 13 is subsequently filtered with the aid of a filter 14 that need not necessarily be present, in order if appropriate, to filter out undesired properties in the frequency response that may still be occurring. The output signal $M_v$ (actual controller torque) of the filter 14 is added with the aid of an adder 19 to the actual precontrol variable $M_{vor}$ (precontrol torque), and the desired torque $M_{soll}$ is calculated in such a way. The desired torque $M_{soll}$ is subsequently fed as input variable to the power module 15, which can be present, for example, in the form of a converter with associated drive electronics, the power module 15 influencing the level of the motor current I in accordance with the desired torque $M_{soll}$ and controlling the movement operation of the machine element in such a way.

A few simplifications are possible in order to implement the model 2. Thus, there is no need to implement a feedback model structure as in the exemplary embodiment—rather, it suffices to implement the model 2 with the aid of linear differential equations that calculate an actual precontrol variable and/or an actual reference variable from a desired reference variable.

It may be remarked at this juncture that the model 2 illustrated in FIG. 2 and the control loop 18 are present in the context of the exemplary embodiment for each machine axis of the machine, means 17 for generating a desired reference variable generating for each machine axis a desired reference variable $x_{soll}$ associated therewith, and prescribing it as input variable to the respectively associated model.

Figure 3:
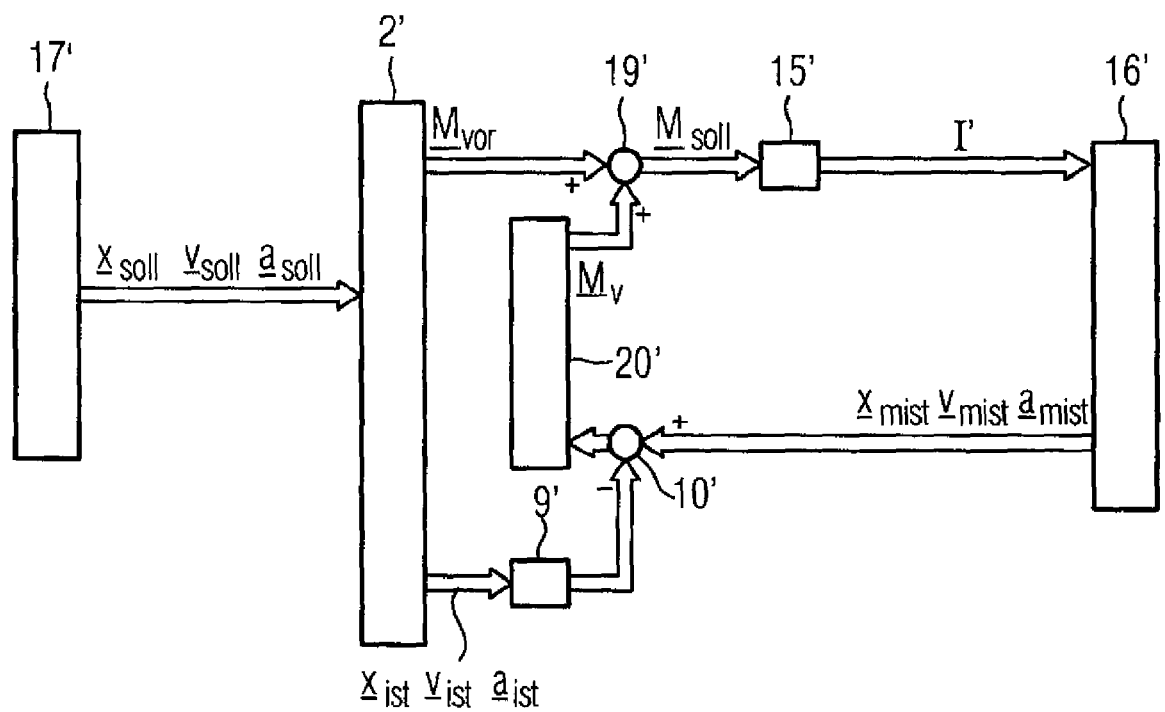
FIG. 3 shows a general schematic of the invention.

FIG. 3 illustrates once again the general inventive idea of the method and of the device, the general case being illustrated in which the individual machine axes can be coupled to one another, that is to say, for example, a variation in the position of one machine axis automatically also effects a variation in the position of other machine axes (for example in the case of a robot arm having a number of joints). A means 17' for generating desired values is used to prescribe as input variables to a model 2' an individual or a number of desired reference variables such as, for example, a desired position $x_{soll}$, a desired speed $v_{soll}$, and/or a desired acceleration $a_{soll}$ The individual variables can be present as vectors in this case, in accordance with the number of the machine axes to be moved. The model 2' in this case determines for the individual machine axes of the machine an individual or number of actual reference variables such as, for example, an actual torque variable $M_{ist}$, an actual speed variable $v_{ist}$ and/or an actual acceleration variable $a_{ist}$. These variables can likewise be present as vectors. They are delayed with the aid of a delay device 9' in accordance with the time delay of the power module 15. At the motor 16' and/or from another site, a subtracter 10' is used to subtract measured variables such as, for example, a measured actual position variable $x_{mist}$, a measured actual speed variable $v_{mist}$ and/or a measured actual acceleration variable $a_{mist}$, it also being possible for the variables to be present as vectors, from the delayed reference variables calculated by the model 2', and to feed the difference to a control 20'. The latter determines the control torque $M_v$ as output variable, and adder 19 is subsequently used to add the precontrol variable $M_{vor}$ of the control torque $M_v$, and the desired torque $M_{soll}$ is determined in such a way and is fed to the power module 15 as input variable (it likewise being possible for $M_{vor}$, $M_v$ and $M_{soll}$ to be present as vectors). In this case the power module 15' supplies the currents I' for the individual motors 16' for moving the machine axis of the machine. It is thereby possible, even in the case of machines in which there are coupled machine axes, to implement the general inventive approach with the aid of a model 2' that also takes account of the couplings of the machine axes.

When generating the desired reference variables, for example, the invention can be used to dispense with a closely set jerk limitation and/or with the use of linear reference variable filters, and thus, in particular, to improve the dynamic behavior of the movement.

What is claimed is:

1. A method for guiding a movement of a moveable machine element of a machine, comprising the steps of:
   specifying a desired reference variable describing a desired movement operation of the machine element,
   determining an actual pre-control variable and an actual reference variable from the desired reference variable with the aid of a model, the model configured as a controlled system model that simulates a dynamic behavior of elements participating in the movement, and
   supplying the actual pre-control variable and the actual reference variable to a control loop for controlling a motor of the machine.

2. The method of claim 1, wherein the method is carried out in real time during the movement operation of the moveable machine element.

3. The method of claim 1, wherein only mechanical properties of the elements participating in the movement are simulated for determining the dynamic behavior.

4. The method of claim 1, wherein the model is implemented as a controlled linear system model which is controlled by a linear control law.

5. The method of claim 1, further comprising the steps of modifying an output variable of the controlled system model by a feedback variable, and feeding the modified output variable back to an input variable of the controlled system model.

6. The method of claim 1, wherein the desired reference variable comprises a desired position, a desired speed or a desired acceleration.

7. The method of claim 1, wherein the actual reference variable is time-delayed before being supplied to the control loop.

8. The method of claim 1, further comprising the step of supplying a difference between the actual reference variable and a measured actual variable to a position controller in the control loop for control the motor.

9. The method of claim 1, wherein the control loop has a speed controller (13), and further comprising the steps of adding an output signal of the speed controller and the actual pre-control variable to form a sum signal, and controlling a motor current with the sum signal.

10. The method of claim 1, wherein the machine comprises a machine tool, a production machine or a robot, or a combination thereof.

11. A device for guiding a movement of a moveable machine element of a machine, the device comprising:
    a unit for specifying a desired reference variable describing a desired movement operation of the moveable machine element,
    a model configured as a controlled system model that simulates a dynamic behavior of elements participating in the movement, the model further configured to determine from the desired reference variable an actual pre-control variable and an actual reference variable, and
    a control loop receiving the actual pre-control variable and the actual reference variable and controlling a motor of the machine.

12. The device of claim 11, wherein the control loop comprises a position controller receiving a difference between the actual reference variable and a measured actual variable for controlling the motor.

13. The device of claim 11, wherein the control loop comprises a speed controller providing an output signal, and wherein a sum formed of the output signal of the speed controller and the actual pre-control variable controls the motor current.

14. The device of claim 11, wherein the machine comprises a machine tool, a production machine or a robot, or a combination thereof.

* * * * *

UNITED STATES PATENT AND TRADEMARK OFFICE
CERTIFICATE OF CORRECTION

PATENT NO. : 7,902,785 B2  Page 1 of 1
APPLICATION NO. : 12/089770
DATED : March 8, 2011
INVENTOR(S) : Joachim Denk et al.

It is certified that error appears in the above-identified patent and that said Letters Patent is hereby corrected as shown below:

Cover Page, column 2:
   OTHER PUBLICATIONS, line 1
   Change "Erlangen-Nëmberg" to --Erlangen-Nümberg--;

Column 8, claim 8, line 46: after "for control" insert --of--.

Signed and Sealed this
Twelfth Day of July, 2011

David J. Kappos
*Director of the United States Patent and Trademark Office*

UNITED STATES PATENT AND TRADEMARK OFFICE
CERTIFICATE OF CORRECTION

PATENT NO.       : 7,902,785 B2                                    Page 1 of 1
APPLICATION NO.  : 12/089770
DATED            : March 8, 2011
INVENTOR(S)      : Joachim Denk et al.

It is certified that error appears in the above-identified patent and that said Letters Patent is hereby corrected as shown below:

Cover Page, column 2:

OTHER PUBLICATIONS, line 1

Change "Erlangen-Nëmberg" to --Erlangen-Nürnberg--;

Column 8, claim 8, line 46: after "for control" insert --of--.

This certificate supersedes the Certificate of Correction issued July 12, 2011.

Signed and Sealed this
Eighth Day of November, 2011

David J. Kappos
*Director of the United States Patent and Trademark Office*